United States Patent [19]
Larson et al.

[11] Patent Number: 5,343,298
[45] Date of Patent: Aug. 30, 1994

[54] CORRELATION OF A WAVEFORM TO A VIDEO IMAGE

[76] Inventors: James K. Larson, 3222 NE. 52nd St., Portland, Oreg. 97213; Daniel G. Teichmer, 3561 NE. 120th, Portland, Oreg. 97220

[21] Appl. No.: 933,543

[22] Filed: Aug. 24, 1992

[51] Int. Cl.$^5$ ............................................. H04N 17/00
[52] U.S. Cl. .................................................... 348/184
[58] Field of Search .................. 358/139, 10, 230, 160; 324/121 R; H04N 17/00

[56] References Cited

U.S. PATENT DOCUMENTS

| | | | |
|---|---|---|---|
| 4,953,017 | 8/1990 | Ivey et al. | 358/139 |
| 5,140,418 | 8/1992 | Rivamonte | 358/139 |
| 5,144,430 | 9/1992 | Boelart | 358/139 |
| 5,166,791 | 11/1992 | Crawford | 358/139 |
| 5,172,216 | 12/1992 | Suzuki et al. | 358/139 X |

Primary Examiner—Victor R. Kostak

[57] ABSTRACT

Correlation between a waveform displayed on a waveform display device and the corresponding portion of a video image displayed on a monitor is achieved by brightening a portion of a video input signal from which the waveform and video image are produced. A horizontal sweep signal is compared with voltages representing the left and right edges of the waveform display device screen to determine the portion of the video input signal that is "on-screen". The on-screen signal is combined with a line select signal to produce a control signal. The control signal is used to level shift the video input signal to provide a "bright-up" feature as part of the video image on the monitor, indicating the portion of the video image being displayed as a waveform on the screen of the waveform display device.

7 Claims, 1 Drawing Sheet

CORRELATION OF A WAVEFORM TO A VIDEO IMAGE

DESCRIPTION OF THE PRIOR ART

The present invention relates to waveform display devices, and more particularly to correlation of a waveform display to a video image on a monitor using a "bright-up" feature to indicate the portion of the video image that is being displayed on the screen of a waveform display device in order to find and identify small defects in the video image or waveform very accurately.

In test and measurement of television equipment a waveform monitor is used to provide an analog display of a waveform representing a portion of a video image. The waveform monitor may display one, two or more lines simultaneously, or may display a series of lines in sequence. When a portion of a particular line is to be examined in a magnification mode, it is not always clear what portion of the video image the waveform represents. A prior method of attempting to correlate a waveform display with a video image is disclosed in U.S. patent application Ser. No. 07/673,167 filed Mar. 18, 1991 by Melling et al entitled "Test Signal Generator Position Cursors", which is a continuation of U.S. patent application Ser. No. 07/340,997 filed Apr. 20, 1989. That method inserts cursors into a test signal that is input to a device under test. The position of the cursors may be controlled from the front panel of the test signal generator. The test signal generator also provides a trigger signal for a waveform display device to trigger a waveform display that is correlated to the position of the cursors relative to the video display on the monitor. However test signal generators are not always readily convenient to a service person while the waveform display device usually is. Also the cursor only indicates the starting point for the waveform display, and does not indicate the portion of the video image represented by the waveform display.

Some current waveform monitors insert a "bright-up" line into the video image by shifting the video signal level of a selected line of the video image to add brightness to the selected video line on a monitor. However this does not provide an indication on the monitor of the portion of the video signal being displayed on a waveform display device screen when less than a full line is displayed.

What is desired is correlation of a waveform on a display device with a video image on a monitor, the correlation being controlled from the waveform display device with an indication on the monitor of the portion of the video image that is being displayed on the display device screen.

SUMMARY OF THE INVENTION

Accordingly the present invention provides correlation of a waveform on the screen of a display device with a video image on a monitor by brightening up a portion of the video image corresponding to the portion of the waveform being displayed. A video signal is input to an amplifier within the waveform display device. A second input to the amplifier is coupled to a switch that is normally grounded. The second input is also coupled to the output of the amplifier. The other position of the switch provides an offset voltage. A control circuit for the switch compares a horizontal sweep signal of the waveform display device, the horizontal sweep signal including horizontal position and magnification information, with a pair of voltages indicating the left and right limits of the portion of the waveform being displayed on the waveform display device to determine the portion of the video image that is "on-screen". Line select logic indicates the line(s) being displayed on the waveform display device. If the horizontal sweep signal is between the horizontal limit voltages and the line(s) selected is being displayed, then the switch applies the offset voltage to the second input of the amplifier to produce a bright line signal within the video image on the monitor.

The objects, advantages and other novel features of the present invention are apparent from the following detailed description when read in light of the appended claims and attached drawing.

DESCRIPTION OF THE PREFERRED EMBODIMENT

Figure 1:
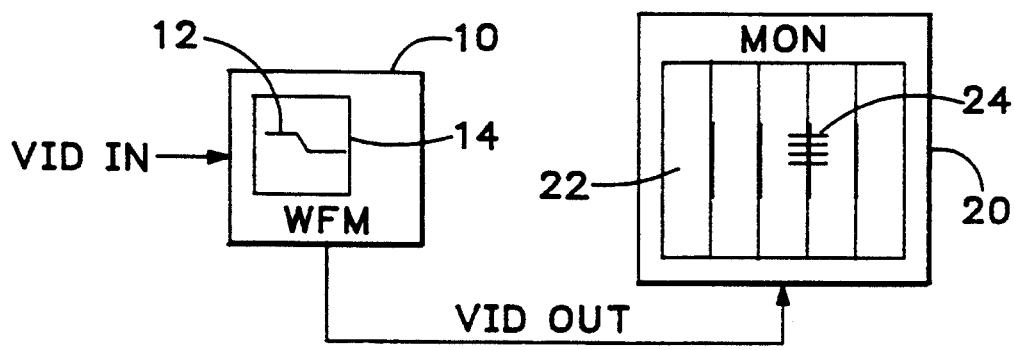
FIG. 1 is a block diagram of a test setup for correlating a waveform to a video image on a monitor using a bright-up feature according to the present invention.

Referring now to FIG. 1 a waveform display device 10, such as a television waveform monitor, receives a video input signal VID_IN from a video signal source, such as a test signal generator, device under test or the like. The waveform monitor 10 is adjusted to display a portion 12 of the video input signal, such as one, two or more lines or a magnified portion thereof. The waveform monitor 10 inserts into the video input signal a "bright-up" feature 24 corresponding to the portion 12 of the video input signal being displayed "on-screen" to produce a video output signal VID_OUT. The video output signal is input to a monitor 20 where the video output signal is displayed as a video image 22. Included in the video image 22 is the bright-up feature 24 that indicates the portion of the video input signal being displayed on the waveform monitor 10.

Figure 2:
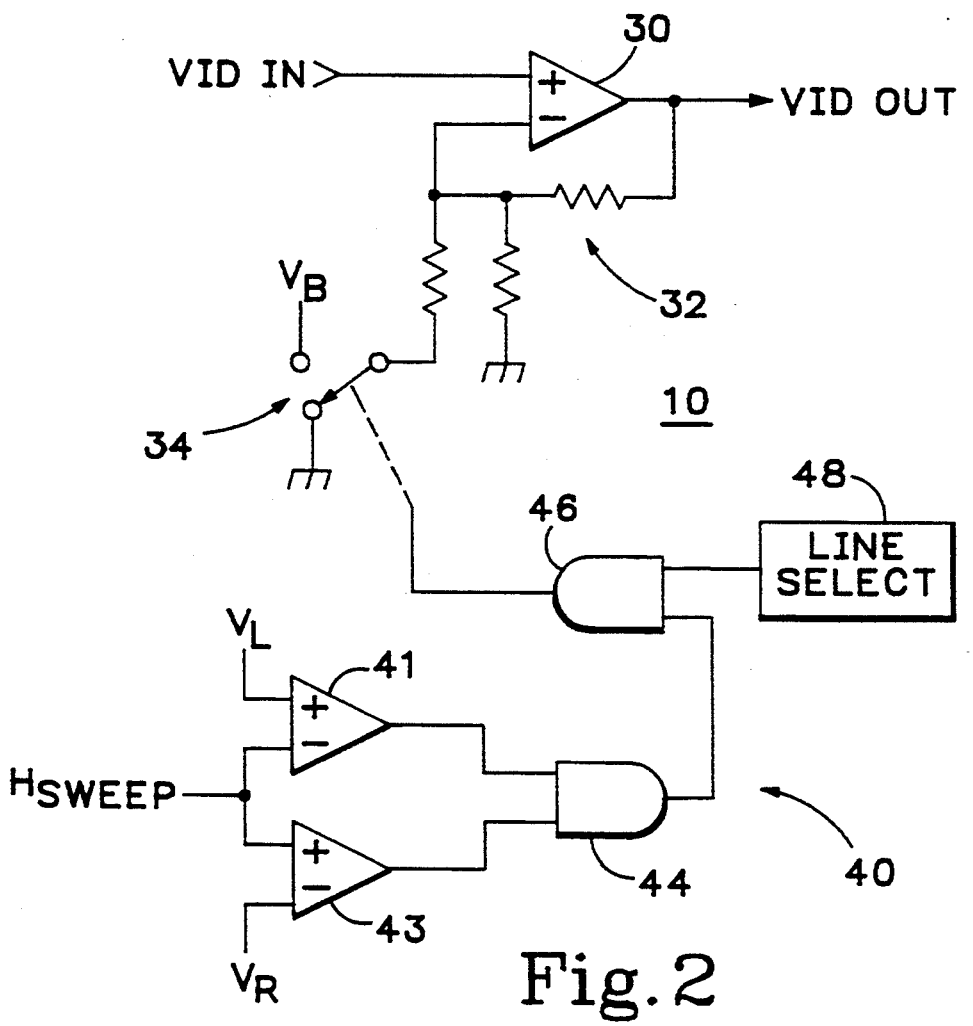
FIG. 2 is a block diagram of a portion of a waveform display device for correlating a waveform to a video image on a monitor using a bright-up feature according to the present invention.

Within the waveform monitor 10, as shown in FIG. 2, circuitry is provided to insert the bright-up feature into the video input signal to produce the video output signal. The video input signal is applied to one input of an amplifier 30, the output of which is the video output signal. The video output signal is applied to a second input of the amplifier 30 via a feedback network 32. A switch 34 also is coupled to the second input of the amplifier 30. In the normal position of the switch 34 the video input signal is amplified normally by the amplifier 30 to produce the video output signal. In the bright-up position of the switch 34 an offset voltage $V_B$ is applied to the second input of the amplifier 30 to shift the video signal level at the output to produce the bright-up feature in the video output signal, i.e., to produce the bright-up feature 24 in the video image 22 displayed on the monitor 20.

A control circuit 40 generates a control signal for the switch 34. As is well known in the art the waveform monitor 10 includes a horizontal sweep circuit that provides a horizontal sweep signal $H_{sweep}$ in the form of a ramp to drive the horizontal deflection circuitry of the waveform monitor. When the waveform display is magnified, a magnification factor is applied to an amplifier to which the horizontal sweep signal is input to effectively increase the slope of the ramp. However voltages $V_L$, $V_R$ that define the left and right edges of the waveform display area 14 remain constant. The result is that the waveform display 12 expands so that a much smaller portion of the video input signal appears within the waveform display area 14. The horizontal sweep signal, after horizontal position and magnification have been included, is input to a pair of comparators 41, 43 where it is compared with the left and right voltages. An AND gate 44 receives the outputs from the comparators 41, 43 so that when the horizontal sweep signal is between the left and right voltages, an "on-screen" signal is produced. The on-screen signal is input to another AND gate together with a line select signal from conventional line select logic 48 within the waveform monitor 10. When the portion of the video input signal being displayed as a waveform 12 is within the display area 14 and the video input signal is at the selected line, then the control signal is generated from the second AND gate 46 to cause the switch 34 to apply the offset voltage to the second input of the amplifier 30. Although a single line may be selected for display on the waveform monitor 10, the line select logic 48 may provide a select signal that selects several lines adjacent to the selected line to produce a rectangular line cursor 24 as shown in FIG. 1. In some cases a limiter circuit, commonly found at the input to the horizontal deflection amplifier, may be modified to perform the function of the comparators 41, 43. The resulting bright-up feature 24 on the monitor 20 moves left or right in response to the horizontal position control and expands or shrinks in response to the magnification control of the waveform display device 10 to indicate the portion of the video image being displayed on the screen of the waveform display device.

Thus the present invention provides correlation of a waveform on a display device to video image on a monitor by determining the portion of the video input signal that appears as an on-screen waveform and generating a brightness control signal that inserts a bright-up feature into the video image when the waveform is on-screen and at a selected video line(s).

What is claimed is:

1. An apparatus for correlating a portion of a video input signal being displayed as a waveform on a waveform display device to a corresponding portion of the video input signal being displayed as a video image on a monitor comprising:

means for determining the portion of the video input signal being displayed as the waveform to produce a control signal; and means for inserting a bright-up feature into the video input signal in response to the control signal so that the video image displays the bright-up feature in the video image at a position and with a length corresponding to the waveform.

2. An apparatus as recited in claim 1 wherein the determining means comprises:

means for comparing a horizontal sweep signal within the waveform display device with left and right voltages corresponding to the left and right edges of the waveform to produce an on-screen signal; and means for combining the on-screen signal with a line select signal corresponding to the line of the video image represented by the waveform to produce the control signal.

3. An apparatus as recited in claim 2 wherein the inserting means comprises:

means for amplifying the video input signal, the output of the amplifying means being provided for input to the monitor; and means for switching a bright-up signal to the amplifying means in response to the control signal so that the bright-up feature is inserted into the video input signal at the output of the amplifying means.

4. An apparatus as recited in claim 3 wherein the amplifying means comprises:

an amplifier having a pair of inputs and an output, the video input signal being coupled to one input and the output being coupled to the other input, the output being the output of the amplifying means; and means for coupling the switching means to the second input of the amplifier.

5. An apparatus as recited in claim 4 wherein the switching means comprises a switch having a first input coupled to a first reference potential, a second input coupled to a second reference potential, an output coupled to the second input of the amplifier and a control input coupled to receive the control signal so that the first reference potential is normally coupled to the second input of the amplifier and the second reference potential is coupled to the second input of the amplifier when the control signal is applied to the control input.

6. An apparatus as recited in claim 2 wherein the comparing means comprises:

a first comparator for comparing the horizontal sweep signal with the left voltage to produce a first output;

a second comparator for comparing the horizontal sweep signal with the right voltage to produce a second output; and a first AND gate having the first and second outputs from the comparators as inputs and providing the on-screen signal as an output.

7. An apparatus as recited in claim 6 wherein the combining means comprises a second AND gate having the on-screen signal and the line select signal as inputs and providing the control signal as an output.

* * * * *